Feb. 23, 1926.  1,574,734
A. McLAREN
SIGNALING APPARATUS
Filed Sept. 5, 1925   2 Sheets-Sheet 1

WITNESSES

INVENTOR
Alexander McLaren
BY
ATTORNEYS

Feb. 23, 1926. 1,574,734
A. McLAREN
SIGNALING APPARATUS
Filed Sept. 5, 1925 2 Sheets-Sheet 2
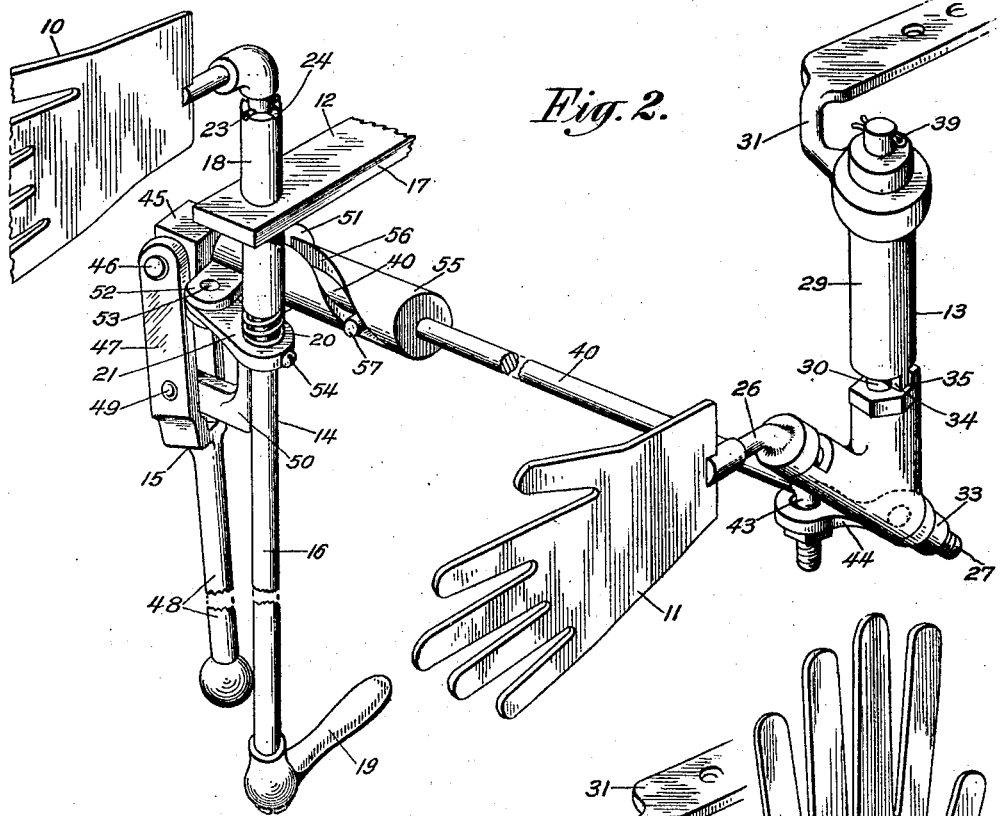
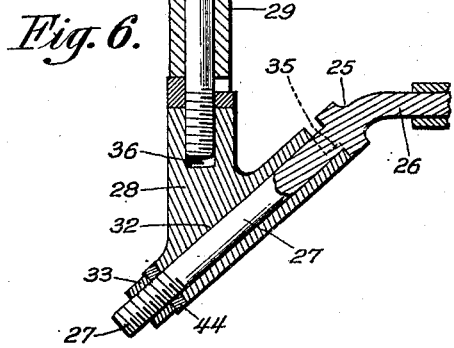
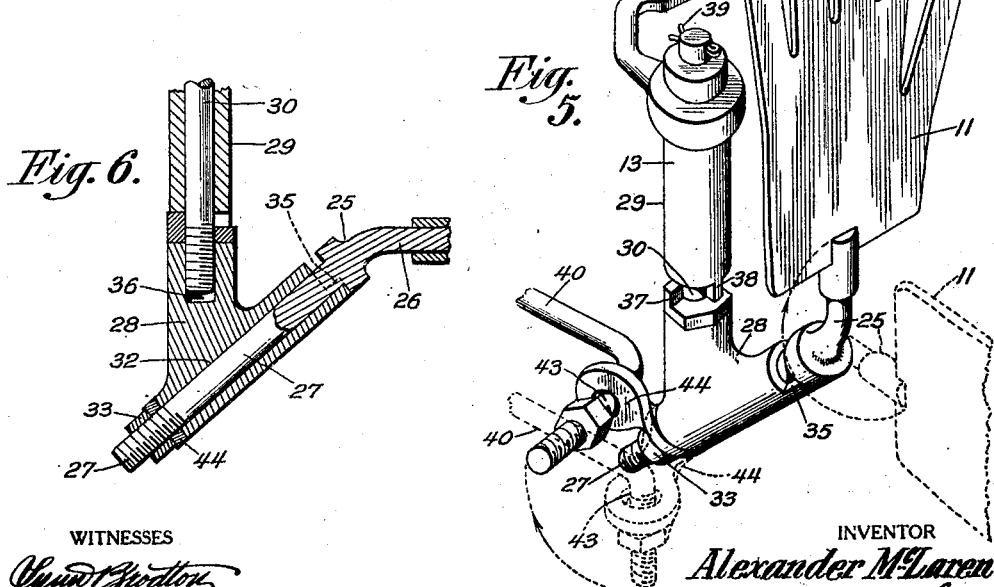
INVENTOR
Alexander McLaren
BY
ATTORNEYS Patented Feb. 23, 1926.

1,574,734

UNITED STATES PATENT OFFICE.

ALEXANDER McLAREN, OF BROOKLYN, NEW YORK.

SIGNALING APPARATUS.

Application filed September 5, 1925. Serial No. 54,758.

*To all whom it may concern:*

Be it known that I, ALEXANDER MCLAREN, a citizen of the United States, and a resident of the city of New York, borough of Brooklyn, in the county of Kings and State of New York, United States of America, have invented a new and Improved Signaling Apparatus, of which the following is a full, clear, and exact description.

This invention relates to signaling apparatuses and has especial reference to the class of signaling apparatuses or devices used upon automobiles in which a signal operates at the front and rear.

The principal object of the present invention is to improve apparatuses or devices of the character mentioned by providing an apparatus which is more thoroughly efficient and effectual for signaling, and one which is more reliable in operation.

In accordance with the present invention a signal, preferably a visual signal is arranged at each end of a vehicle such as an automobile, means being provided for simultaneously moving said signals to similar signaling and non-signaling positions respectively for indicating left and right turns, and means being provided for moving one of the signals to a signaling and non-signaling position independently of the other signal to indicate that the vehicle is slowing up and is about to stop.

The nature of the present invention and its distinguishing features and advantages will appear when the following specification is read in conjunction with the accompanying drawings, in which:

Fig. 2 is a perspective view of the apparatus on an enlarged scale with portions of certain of the parts being broken away, and showing the signals moved to indicate a left turn.

Fig. 5 is a view similar to the view shown in Fig. 4, with the rear signal moved to its fourth position for indicating that the vehicle is about to stop.

Fig. 6 is a detail sectional view of features of the mounting of the rear signal.

Figure 1:
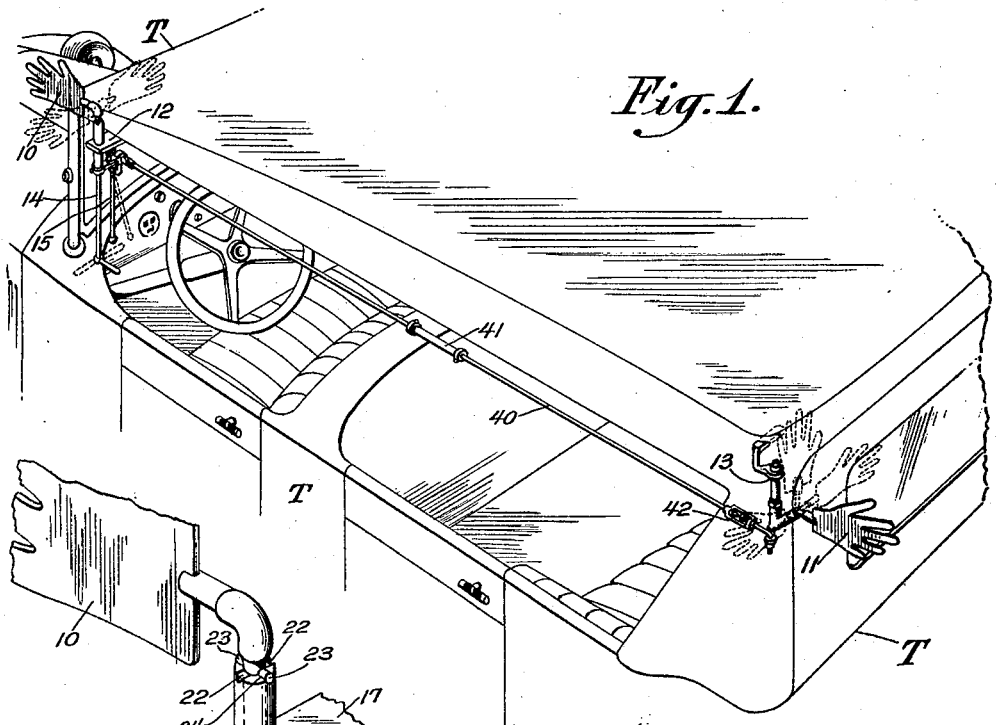
Figure 1 is a perspective view of a portion of an automobile looking down from one side toward the top thereof and showing the apparatus of the present invention applied thereto.

The signaling apparatus of the present invention, generally stated, comprises a front signal 10 which may be of any preferred pattern, a rear signal 11, which will be similar to the signal 10, means 12 for mounting the front signal 10, means 13 for mounting the rear signal 11, operating means 14 for operating the signals 10 and 11 in unison, and operating means 15 for operating the signal 11 independently.

Figure 3:
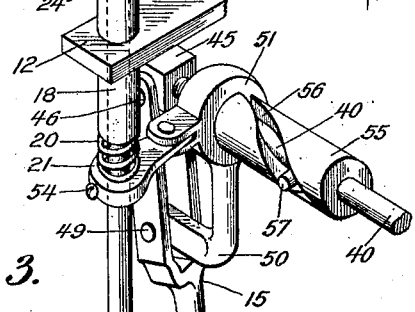
Fig. 3 is a perspective view of the signal operating means, and showing the front signal in a neutral position.
Figure 4:
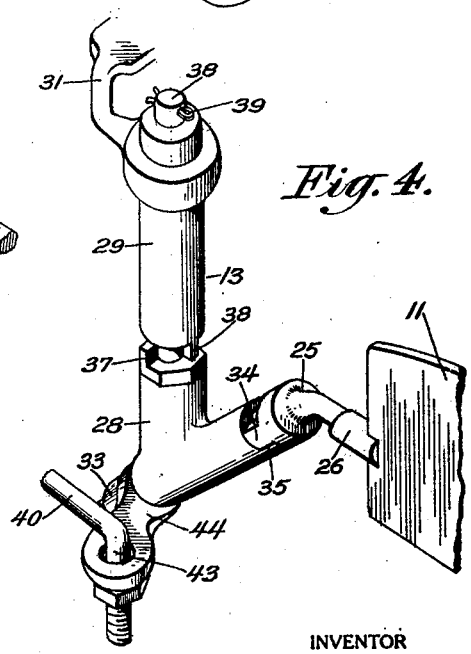
Fig. 4 is a perspective view of the mounting of the rear signal and a portion of the rear signal; the same being shown in a neutral position.

More specifically stated, the invention consists of the parts constituting the aforesaid elements presently to be described. The front signal 10 which is in the form of a hand is attached to the upper end of a shaft 16 so as to be horizontally disposed. The shaft 16 is supported for turning movement by the mounting 12 which consists of a plate 17 having a tubular member 18. The plate 17 is attached in any suitable manner to the frame of the top T of the automobile, and the shafts 16 extend through the member 15. The shaft 16 has attached to the lower end thereof a handle 19 for imparting turning movement to the shaft. The shaft is under the influence of a spring 20 which surrounds the same and which is arranged between the collar of an arm 21 and the lower end of the member 18. The upper end of the member 18 is provided with recesses 22 which are diametrically opposite each other, and the opposite ends 23 of a transversely arranged pin carried by the shaft 16 are capable of being moved respectively into and out of the recesses 22 to temporarily retain the signal 10 in its left and right indicating positions. The upper end of the member 18 is also provided with a recess 24 for receiving one of the ends 23 for temporarily retaining the signal 10 in a neutral position. The rear signal 11 is similar in construction to the signal 10 and is carried by a shaft 25 having angularly disposed portions 26 and 27. The mounting 13 for the signal 11 includes parts 28, 29, 30 and 31. The part 28 has a bore 32 which receives the portion 27 of the shaft 25. A nut 33 is applied to the screw threaded end of the portion 27 to prevent the withdrawal of the shaft 25. The portion 27 is capable of turning movement, and this turning movement is limited by coacting stops 34 and 35 respectively by the shaft 25 and the part 28. The shaft 25 has limited turning movement in opposite directions with respect to the part 28. A portion of the part 28 has a screw threaded bore 36 therein which receives the lower screw threaded end of the part 30 which is in the nature of a shaft turnably mounted in the part 29 which is attached to or formed integral with the part 31. The part 31 is in the nature of an attaching plate and serves for effecting the attachment of the mounting 13 to the rear end of the top T. The shaft 30 and part 28 turn together, and this turning movement is limited by virtue of stops 37 and 38 embodied respectively by the parts 28 and 29. A split pin 39 or other serviceable means functions to hold the shaft 30 against endwise movement downwardly. A rod 40 is employed and this rod is made of two sections connected together by a coupling 41 and is adjustable as to length by virtue of a turnbuckle 42. One end of the rod 40 is connected as at 43 to a short arm 44 which is attached to the portion 27 of the shaft 25 to move therewith. The opposite end of the rod 40 is turnably connected to a block 45. The block 45 has connected thereto for pivotal movement as at 46 a fork 47 of a hand lever 48. The lever 48 is loosely fulcrumed as at 49 to a portion of a part 50 whose collar 51 loosely surrounds the rod 40. The collar 51 has spaced lugs 52 between which an end of the arm 21 is disposed and to which it is connected as at 53 for pivotal movement; the arm 21 being secured to the shaft 16 by the use of a set screw 54. The parts 16, 19, 21, 25, 28, 30, 40, 43, 45, 47 and 50 constitute the means 14 for operating the signals 10 and 11 in unison. Connected to the collar 51 and surrounding the rod 40 is a guide 55. The guide 55 has a slot 56 therein which extends from the one end of the guide 55 to the other with one end beginning at a point substantially 120° of a circle with respect to the other end. A pin 57 extends radially outward from the rod 40 into the slot 56. When the signal 11 is in its neutral position as shown in Fig. 4, by moving the lever 48 in the direction indicated by the arrow in Fig. 3, the pin 57 will be caused to move along the walls of the slot 56 and as a result the rod 40 beside having endwise movement will be caused to turn causing a pull on the arm 44. The pull or the arm 44 will cause a turning movement of the portion 27 of the shaft 25 and due to the angular formation of the shaft 25 the signal 11 will be moved to the position shown in Fig. 5 to indicate that the vehicle is about to stop or is slowing down. It will now be understood that the parts 25, 40, 44, 45, 48, 50, 55 with slot 56, and 57, constitute the means 15 for operating the signal 11 independently.

It is to be understood that the apparatus will be so arranged upon the vehicle that the handle 19 and lever 48 will be disposed within convenient reach of the operator of the vehicle. By grasping the handle 19 and by moving the same the signals 10 and 11 will be moved in response thereto to either indicate a left turn, a right turn, or to be disposed in a non-signaling or neutral position. When the signals 10 and 11 are brought to a neutral or non-signaling position, the lever 48 may then be manipulated to cause the movement of the signal 11 only from a neutral position to a signaling position indicating that the vehicle is about to slow down or to indicate that the vehicle is about to stop.

It is to be understood that the invention is not restricted to the precise arrangement of parts shown and described, as details of construction may be modified and rearranged without departing from the spirit of the invention, the scope of which is limited only by the terms of the appended claims.

I claim:

1. Signaling apparatus comprising a plurality of signals arranged for movement to signaling and non-signaling positions, means for simultaneously moving said signals to similar signaling and non-signaling positions respectively, and means for moving one of said signals to a third and distinctive signaling position independently of the other signal.

2. Signaling apparatus comprising a plurality of signals arranged for movement to signaling and non-signaling positions, means for simultaneously moving said signals to similar signaling and non-signaling positions respectively, and means for moving one of said signals to a third and distinctive signaling position from a non-signaling position independently of the other signal.

3. Signaling apparatus comprising a plurality of signals arranged for movement to signaling and non-signaling positions, means for simultaneously moving said signals to similar signaling and non-signaling positions respectively, and means for moving one of said signals to a third and distinctive signaling position and to a non-signaling position independently of the other signal.

4. Signaling apparatus comprising a signal, means for supporting said signal for compound movement so that the signal will be movable through an arc in a horizontal plane and through an arc in a plane intersecting the horizontal plane, and means for effecting the movement of the signal through its arcs of movement.

5. Signaling apparatus comprising a plurality of signals arranged for movement to signaling and non-signaling positions, means for simultaneously moving said signals to similar signaling and non-signaling positions respectively, means for moving one of said signals to a third and distinctive signaling position independently of the other signal, and means for releasably retaining the signals in signaling and non-signaling positions.

6. Signaling apparatus comprising a plurality of signals arranged for movement to signaling and non-signaling positions, means for simultaneously moving said signals to similar signaling and non-signaling positions respectively, means for moving one of said signals to a third and distinctive signaling position independently of the other signal, and means for limiting the movement of the signals.

7. Signaling apparatus comprising a plurality of signals arranged for movement to signaling and non-signaling positions, means for simultaneously moving said signals to similar signaling and non-signaling positions respectively, means for moving one of said signals to a third and distinctive signaling position independently of the other signal, means for limiting the movement of the signals, and means for releasably retaining the signals in signaling and non-signaling position.

8. A signaling apparatus comprising a signal, supporting means for mounting the signal so as to be movable to two different horizontally disposed positions and to a vertically disposed third position, and means for effecting the movement of the signal to the horizontally and vertically disposed positions.

9. A signaling apparatus comprising a signal, supporting means for mounting the signal so as to be movable to two different horizontally disposed positions and to a vertically disposed third position, means for effecting the movement of the signal to the horizontally and vertically disposed positions, and means for releasably retaining the signal in its horizontal disposed positions.

10. A signaling apparatus comprising a signal, supporting means for mounting the signal so as to be movable to different horizontally disposed positions and to a vertically disposed position, said supporting means comprising a fixed bracket, a shaft turnably carried by said bracket, a mount secured to said shaft and movable therewith, a second shaft having angularly disposed portions, one of said portions being turnably associated with said mount, the other of said portions having the signal attached thereto; and means connected to the portion of said second shaft which is turnably associated with said mount for effecting the movement of the signal to the horizontally and vertically disposed positions.

ALEXANDER McLAREN.